W. S. ROGERS.
BALL RETAINER.
APPLICATION FILED OCT. 11, 1913.
1,182,795.
Patented May 9, 1916.
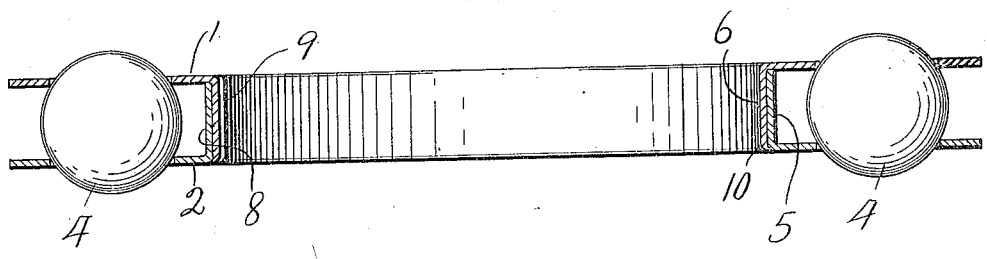
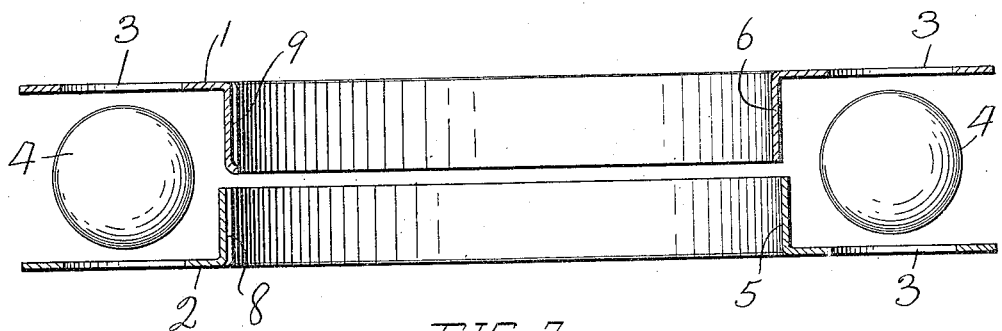
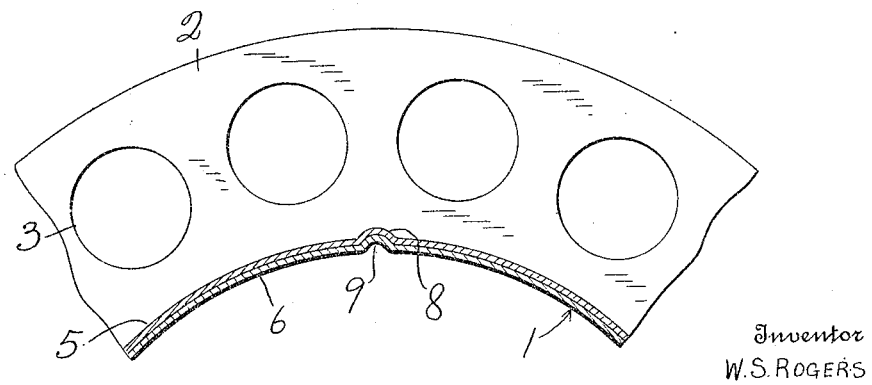
Inventor
W. S. ROGERS
Witnesses
By Watson E. Coleman
Attorney

UNITED STATES PATENT OFFICE.

WINFIELD S. ROGERS, OF BANTAM, CONNECTICUT, ASSIGNOR OF ONE-HALF TO NELLIE M. SCOTT, OF BANTAM, CONNECTICUT.

BALL-RETAINER.

1,182,795.  Specification of Letters Patent.  Patented May 9, 1916.

Application filed October 11, 1913. Serial No. 794,686.

*To all whom it may concern:*

Be it known that I, WINFIELD S. ROGERS, a citizen of the United States, residing at Bantam, in the county of Litchfield and State of Connecticut, have invented certain new and useful Improvements in Ball-Retainers, of which the following is a specification, reference being had to the accompanying drawings.

This invention relates to an improved cage or retainer for bearing balls.

The principal objects of the invention are to provide a construction for this purpose which can be formed of two simple pieces of sheet metal adapted to be stamped out and formed in similar dies; to provide a construction of this character in which the two parts of the retainer can be brought together and permanently united to each other by machinery before the balls are applied; to provide means whereby although these parts are rigidly held together yet their edges are separate from each other so that the balls can be forced between them into their positions in the perforations without danger of disconnecting or dislocating the parts; and to provide exceedingly simple means whereby in assembling they must necessarily be assembled in exactly the right position with respect to each other, said means also constituting means for preventing the two parts turning on each other and thus getting out of register and permitting the balls to bind.

For a full understanding of the invention, reference is to be had to the following description and accompanying drawing, in which—

Figure 1 is a transverse sectional view of a ball retainer or cage constructed in accordance with my invention; Fig. 2 is a similar view with the parts unattached and arranged in juxtaposition to each other; and Fig. 3 is a fragmentary circumferential section.

Corresponding and like parts are referred to in the following description and designated in all of the views of the accompanying drawing by like reference characters.

Referring to the drawing, the numerals 1 and 2 designate two complemental annular plates or sections that are designed to mate one with the other, each being provided with any desired number of openings 3 for the bearing balls 4. One of the plates is formed with a centrally disposed annular flange 5 and the other plate is correspondingly formed with a centrally disposed annular flange 6, which fits snugly within the flange 5, as clearly illustrated in the drawing. The flange 6 in its initial condition is straight or plane, transversely considered, and in the manufacture of the cage or retainer, the relatively free edge of said flange is pressed by a suitable die or the like outwardly in a radial direction into close contact with the adjoining slightly rounded attached or base end of the flange 5 and flush with the outermost face of the adjoining plate, whereby the two plates 1 and 2 will be held together without soldering, welding or independent fastening devices and both side faces of the cage or retainer will be uniform.

Means is provided whereby the ball receiving openings 3 of the plates 1 and 2 shall be held in absolutely true transverse alinement or registry with each other, and to effect this result, I form in each of the flanges 5 and 6 transversely disposed notches or grooves designated 8 and 9 respectively, said grooves being punched or otherwise formed in the manufacture of the plates in the metal of which the flanges are formed and producing slight ribs or protuberances on the peripheries of the flanges. The groove 8 in the flange 5 extends through the same, being open at both ends and throughout its extent, as clearly illustrated in the drawing, while the groove 9 terminates at and is closed in the relatively free edge of the flange 6 which is subsequently pressed outwardly to form the bead 10. It will at once be seen that by the provision of these registering grooves or notches, no mistake can be made in assembling the parts and hence the ball receiving openings 3 of one plate will be sure to be in true alinement or registry with the corresponding openings of the other plate. Moreover, the two parts can be assembled in a minimum of time on account of the fact that the notches 8 and 9 are arranged longitudinally with respect to the direction in which the parts are put together. This reduces the cost of manufacture because the assembling is an important element of that cost. Moreover, when assembled these registering notches absolutely prevent the two parts from turning on each other and thus getting the perforations out of registration, therefore the balls will not bind in practice. The permanent uniting of the two elements of the retainer by means of the bead 10 is also an important feature because in this way a solid double wall is secured at the inner side of the annulus which gives the article great strength at this point although formed of very thin sheet metal. Yet the two plates project freely from the edges of this annulus and after the other parts are assembled the balls can be inserted from the edges by forcing them in, springing the plates apart by that act and allowing the plates to spring back into position again or forcing them back into place. On account of the strong and positive connection of the two plates at the center there is no danger of their becoming disconnected or dislocated when the balls are forced into position between them. This avoids the necessity of placing the balls around on one plate and then securing the other plate in position while those balls are in a condition from which they can easily be dislodged. In other words the two plates are not assembled while the balls are held simply by one plate as has been necessary in some previous cases.

Although I have illustrated and described only a single embodiment of the invention, I am aware of the fact that many modifications can be made therein by any person skilled in the art without departing from the scope of the invention as expressed in the claims. Therefore I do not wish to be limited to all the details of construction herein shown and described, but What I do claim is:—

1. A ball retainer comprising a pair of perforated annular plates provided on their inner peripheries with integral cylindrical flanges adapted to fit in close telescopic engagement, means for rigidly securing said pair of telescopically engaged cylindrical flanges together with their ends in firm engagement about the inner peripheries of said perforated annular plates, and interengaging means projecting from the outer peripheries of said cylindrical flanges for positioning and positively locking said flanges against relative turning.

2. A ball retainer comprising a pair of perforated annular plates provided on their inner peripheries with integral cylindrical flanges adapted to fit in close telescopic engagement, positioning and locking ribs extending axially on the outer peripheries of said cylindrical flanges and adapted to interengage in the telescopic engagement of said flanges, and means for rigidly securing said pair of telescopically engaged cylindrical flanges together with their ends in firm engagement about the inner peripheries of perforated annular plates.

In testimony whereof I hereunto affix my signature in the presence of two witnesses.

WINFIELD S. ROGERS.

Witnesses:
 RUTH EDWARDS,
 KATHERINE L. DEMPSEY.

Copies of this patent may be obtained for five cents each, by addressing the "Commissioner of Patents, Washington, D. C."